(12) United States Patent
Hänel et al.

(10) Patent No.: US 11,860,001 B2
(45) Date of Patent: Jan. 2, 2024

(54) SENSOR HOUSING FOR A MULTI-PARAMETER SENSOR, SENSOR SET AND MULTI-PARAMETER SENSOR

(71) Applicant: Endress+Hauser Conducta GmbH+Co. KG, Gerlingen (DE)

(72) Inventors: Axel Hänel, Waldheim (DE); Christian Fanselow, Geringswalde (DE); André Pfeifer, Schkopau (DE); Simon Rehn, Weil am Rhein (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 18/065,802

(22) Filed: Dec. 14, 2022

(65) Prior Publication Data

US 2023/0184569 A1    Jun. 15, 2023

(30) Foreign Application Priority Data

Dec. 15, 2021  (DE) ...................... 10 2021 133 354.7

(51) Int. Cl.
*G01D 11/24* (2006.01)

(52) U.S. Cl.
CPC .................... *G01D 11/245* (2013.01)

(58) Field of Classification Search
CPC ............................. G01D 11/245; G01D 11/24
See application file for complete search history.

(56) References Cited

FOREIGN PATENT DOCUMENTS

| CN | 209696956 U | * 11/2019 |
| DE | 102020006426 A1 | 12/2020 |
| DE | 202021102073 U1 | 4/2021 |

* cited by examiner

*Primary Examiner* — Jamel E Williams
(74) *Attorney, Agent, or Firm* — Christopher R. Powers; Endress+Hauser (USA) Holding, Inc.

(57) ABSTRACT

The present disclosure relates to a sensor housing for a multi-parameter sensor, the sensor housing including: at least two connection points, wherein a first connection point is configured to receive a first sensor, and a second connection point is configured to receive a second sensor different from the first sensor, wherein the first connection point includes a first mistake-proofing feature for the first sensor, and the second connection point includes a second mistake-proofing feature for the second sensor, wherein the first and second mistake-proofing feature are configured such that only the first sensor can be inserted into the first connection point and only the second sensor can be inserted into the second connection point, respectively.

10 Claims, 4 Drawing Sheets

SENSOR HOUSING FOR A MULTI-PARAMETER SENSOR, SENSOR SET AND MULTI-PARAMETER SENSOR

The present application is related to and claims the priority benefit of German Patent Application No. 10 2021 133 354.7, filed on Dec. 15, 2021, the entire contents of which are incorporated herein by reference.

TECHNICAL FIELD

The present disclosure relates to a sensor housing for a multi-parameter sensor, sensor set and multi-parameter sensor.

BACKGROUND

In analytical measurement technology, especially, in the fields of water management, of environmental analysis, in industry, e.g., in food technology, biotechnology, and pharmaceutics, as well as for the most varied laboratory applications, measurands, such as the pH value, the conductivity, or even the concentration of analytes, such as ions or dissolved gases in a gaseous or liquid measurement medium, are of great importance. These measurands can be captured and/or monitored, for example, by means of electrochemical sensors, such as potentiometric or amperometric sensors.

If multiple measurands are to be measured simultaneously in an application, or a further interdependent measurand is required for determining a measurand, so-called multi-parameter sensors are generally used, in which a plurality of sensors are accommodated. The different sensors are generally accommodated exchangeably in the multi-parameter sensor, so that, when a sensor comes to the end of its service life, it is possible to replace only this sensor instead of replacing all the sensors. Usually, a specific sensor is assigned to a specific slot in the multi-parameter sensor. This means that when multiple sensors are replaced, or when the multi-parameter sensor is equipped for the first time, care must be taken that each sensor be inserted at the correct slot. If a sensor is installed at the wrong slot, this naturally leads to incorrect measurements and to additional working effort, since the sensors have to be removed and re-installed. This causes undesirably long pause times of the multi-parameter sensor and increased maintenance effort.

SUMMARY

It is therefore an object of the present disclosure to propose a solution which enables a multi-parameter sensor to be put into operation and maintained reliably and in a time-saving manner. This object is achieved by a sensor housing for a multi-parameter sensor according to the present disclosure.

The sensor housing according to the present disclosure comprises at least two connection points. A first connection point is suitable for receiving a first sensor, and a second connection point is suitable for receiving a second sensor different from the first sensor. The first connection point has a first geometric, mistake-proofing feature for the first sensor, and the second connection point has a second geometric, mistake-proofing feature for the second sensor, so that only the first sensor can be inserted into the first connection point, and only the second sensor can be inserted into the second connection point.

The sensor housing according to the present disclosure allows only the first sensor provided for the first connection point to actually be used in the first connection point, and only the second sensor provided for the second connection point to actually be used in the second connection point. Any possible confusion is thus prevented. This allows the multi-parameter sensor to be put into operation, operated, and maintained reliably and in a time-saving manner.

According to one embodiment of the present disclosure, the first geometric, mistake-proofing feature comprises a first thread with a first pitch and/or a first thread profile, and the second geometric, mistake-proofing feature comprises a second thread with a second pitch different from the first pitch and/or a second thread profile different from the first thread profile.

According to a further embodiment of the present disclosure, the first geometric, mistake-proofing feature has a first keyhole with a first hole shape, and the second geometric, mistake-proofing feature has a second keyhole with a second hole shape different from the first hole shape.

The aforementioned object is likewise achieved by a sensor set for a sensor housing for a multi-parameter sensor according to the present disclosure. A sensor set according to the present disclosure comprises: a first sensor having a first sensor shaft for fastening the first sensor in a first connection point of the sensor housing; and a second sensor with a second sensor shaft for fastening the second sensor in a second connection point of the sensor housing. The first sensor shaft has a third geometric, mistake-proofing feature for the first connection point, and the second sensor shaft has a fourth geometric, mistake-proofing feature for the second connection point, so that only the first sensor can be inserted into the first connection point, and only the second sensor can be inserted into the second connection point.

According to one embodiment of the present disclosure, the third geometric, mistake-proofing feature comprises a third thread with a first pitch and/or a first thread profile, and the fourth geometric, mistake-proofing feature has a fourth thread with a second pitch different from the first pitch and/or a second thread profile different from the first thread profile.

According to one embodiment of the present disclosure, the third thread and the fourth thread each have a thread start which has a flank. The third thread and the fourth thread extend around a first axis, and the flank extends along a second axis. An angle between 0° and 70° is defined between the first axis and the second axis.

According to one embodiment of the present disclosure, the third geometric, mistake-proofing feature has a first key bit with a first bit shape, and the fourth geometric, mistake-proofing feature has a second key bit with a second bit shape different from the first bit shape.

The aforementioned object is likewise achieved by a multi-parameter sensor according to the present disclosure. A multi-parameter sensor according to the present disclosure comprises: a sensor housing according to the present disclosure; and a sensor set according to the present disclosure.

The first geometric, mistake-proofing feature is complementary to the third geometric, mistake-proofing feature, and the second geometric, mistake-proofing feature is complementary to the fourth geometric, mistake-proofing feature.

The aforementioned object is likewise achieved by a multi-parameter sensor according to present disclosure. A multi-parameter sensor according to the present disclosure comprises: a sensor housing according to the present disclosure; a sensor set with at least a first sensor and a second sensor; a first sleeve having a first internal thread and a first external thread, wherein the first internal thread is different from the first external thread; and a second sleeve having a second internal thread and a second external thread, wherein the second internal thread is identical to the first internal thread, and the second external thread is different from the first external thread.

A first connection point is suitable for receiving a first sensor with the first sleeve, and a second connection point is suitable for receiving a second sensor, which is different from the first sensor, with the second sleeve. The first connection point has a first thread, and the second connection point has a second thread. The first sensor has a first sensor shaft, and the second sensor has a second sensor shaft. The first sensor shaft and the second sensor shaft each have a third thread. The first internal thread of the first sleeve and the third thread of the first and second sensor shafts are complementary. The first external thread of the first sleeve and the first thread of the first connection point are complementary. The second external thread of the second sleeve and the second thread of the second connection point are complementary.

According to one embodiment of the present disclosure, the first external thread of the first sleeve has a first pitch and/or a first thread profile, and the second external thread of the second sleeve has a second pitch different from the first pitch and/or a second thread profile different from the first thread profile.

BRIEF DESCRIPTION OF THE DRAWINGS

The present disclosure is explained in more detail using the following figures, which include.

DETAILED DESCRIPTION

Figure 1:
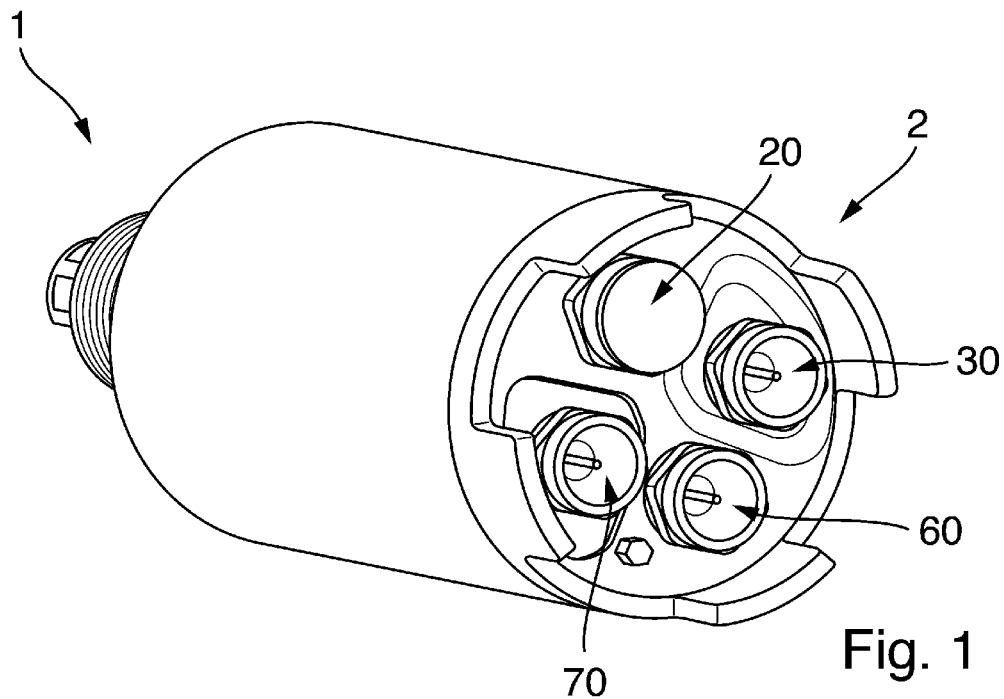
FIG. 1 shows a perspective view of a multi-parameter sensor according to the present disclosure.

FIG. 1 shows an exemplary embodiment of a multi-parameter sensor 1 according to the present disclosure with a sensor set 2, which has, for example, four sensors 20, 30, 60, 70. Of course, the sensor set 2 can also have more or fewer than four sensors. In any case, however, the sensor set 2 has at least two sensors.

Figure 2:
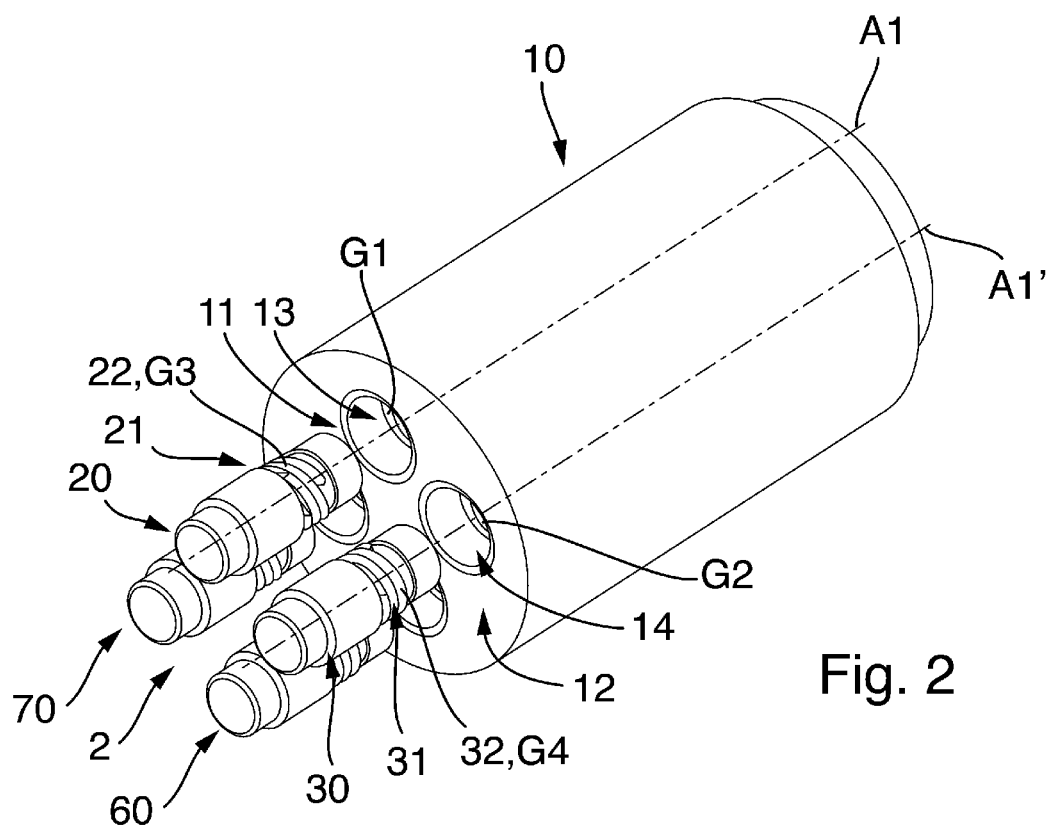
FIG. 2 shows a perspective view of a sensor housing of the multi-parameter sensor shown in FIG. 1.

The multi-parameter sensor 1 comprises a sensor housing 10 with at least two connection points 11, 12. A first connection point 11 is for receiving a first sensor 20, and a second connection point 12 is for receiving a second sensor 30. FIG. 2 shows an embodiment with four connection points for four sensors. Of course, the multi-parameter sensor 1 has as many connection points as sensors.

The first connection point 11 has a first geometric, mistake-proofing feature 13, and the second connection point 12 has a second geometric, mistake-proofing feature 14 different from the first geometric, mistake-proofing feature 13. The first geometric mistake-proofing feature 13 allows only the first sensor 20 to be inserted into the first connection point 11, and the second geometric, mistake-proofing feature 14 allows only the second sensor 30 to be inserted into the second connection point 12. If further connection points are present in the sensor housing 10, each connection point has an individual geometric, mistake-proofing feature.

The first geometric, mistake-proofing feature 13 is, for example, a first thread G1 with a first pitch S1. The second geometric, mistake-proofing feature 14 is, for example, a second thread G2 with a second pitch S2 different from the first pitch S1. For example, the first pitch S1 is 4, and the second pitch S2 is 6. Thus, when screwed into the first connection point 11 with the first geometric, mistake-proofing feature 13, the first sensor 20 is screwed in by 4 mm along the sensor axis, i.e., a first axis A1, during one complete revolution of the sensor, and the second sensor 30 is screwed into the second connection point 12 with the second geometric, mistake-proofing feature 14 by 6 mm along the sensor axis, i.e., the first axis A1', during one complete revolution of the sensor. The first thread G1 may have a number of turns different from the second thread G2. The first thread G1 may have, for example, two thread turns, and the second thread G2 may have, for example, three thread turns.

Alternatively or in addition to the described embodiment with different pitches of the different threads, the threads have different thread profiles. According to such an embodiment, the first thread G1 has a first thread profile GP1, and the second thread G2 has a second thread profile GP2. The first thread profile GP1 is, for example, a metric ISO trapezoidal thread, and the second thread profile GP2 is, for example, a steel-armored pipe thread or a pipe thread or buttress thread.

Figure 5:
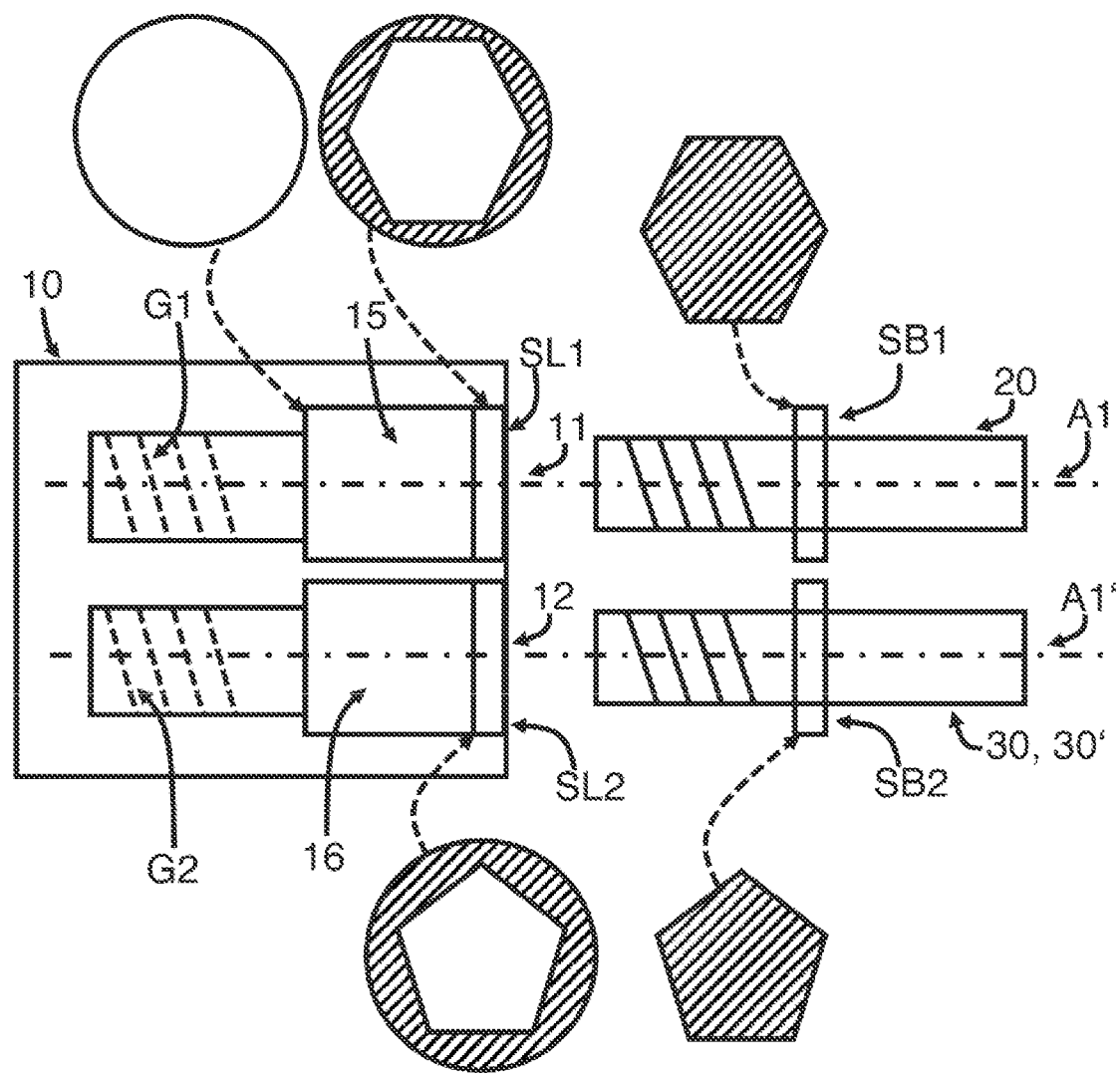
FIG. 5 shows a schematic representation of an embodiment of a sensor with mistake-proofing feature for a multi-parameter sensor of FIG. 1.

Alternatively or in addition to the described embodiments of the geometric mistake-proofing feature, the first geometric, mistake-proofing feature 13 of the first connection point 11 has a first keyhole SL1 with a first hole shape, and the second geometric, mistake-proofing feature 14 of the second connection point 12 has a second keyhole SL2 with a second hole shape different from the first hole shape (see FIG. 5). The first hole shape has, for example, a hexagonal shape, and the second hole shape is, for example, round, oval, or has a polygonal shape or a multi-toothed profile. According to this embodiment, the first connection point 11 extends along a first axis A1. The first keyhole SL1 is arranged such that it forms an entrance to the first connection point 11. A first cavity 15 is formed axially behind the first keyhole SL1 in the insertion direction. The first thread G1 is arranged axially behind the first cavity 15. The second keyhole SL2, a second cavity 16, and the second thread G2 of the second connection point 12 are arranged as in the first connection point 11.

Figure 3:
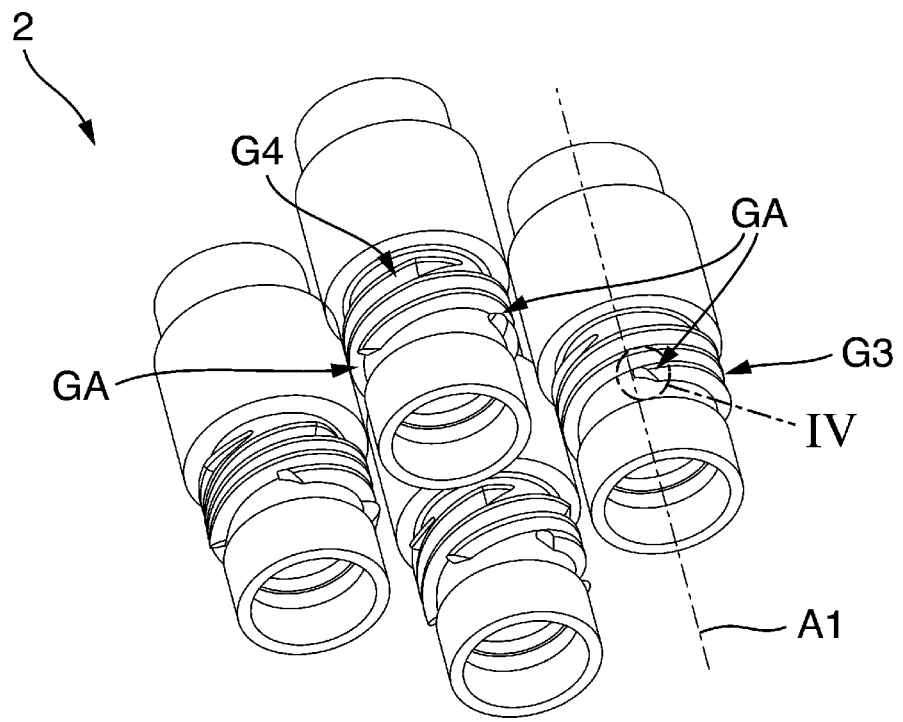
FIG. 3 shows a schematic representation of a sensor set with four sensors of the multi-parameter sensor of FIG. 1.

FIGS. 2 and 3 show the sensor set 2 for the sensor housing 10 of the multi-parameter sensor 1. The sensor set 2 comprises at least the first sensor 20 and the second sensor 30. Of course, the sensor set 2 can also have more than two sensors, for example, four sensors (see FIG. 2).

The first sensor 20 has a first sensor shaft 21 for fastening the first sensor 20 in the first connection point 11 of the sensor housing 10. The second sensor 30 has a second sensor shaft 31 for fastening the second sensor 30 in the second connection point 12 of the sensor housing 10. The first sensor shaft 21 has a third geometric, mistake-proofing feature 22 for the first connection point 11. The second sensor shaft 31 has a fourth geometric, mistake-proofing feature 32 for the second connection point 12. Owing to the third geometric, mistake-proofing feature 22, the first sensor 20 can be inserted only into the first connection point 11.

Owing to the fourth geometric, mistake-proofing feature 32, the second sensor 30 can be inserted only into the second connection point 12.

The first geometric, mistake-proofing feature 13 is complementary to the third geometric, mistake-proofing feature 22. The second geometric, mistake-proofing feature 14 is complementary to the fourth geometric, mistake-proofing feature 32.

The third geometric, mistake-proofing feature 22 is, for example, a third thread G3 with the first pitch S1, and the fourth geometric, mistake-proofing feature 32 is, for example, a fourth thread G4 with the second pitch S2. Thanks to the different pitches, a sensor can be inserted only at a specific connection point.

Alternatively or in addition to the described embodiment with different pitches of the different threads, the threads have different thread profiles. According to this embodiment, the third thread G3 has the first thread profile GP1, and the fourth thread G4 has the second thread profile GP2.

Figure 4:
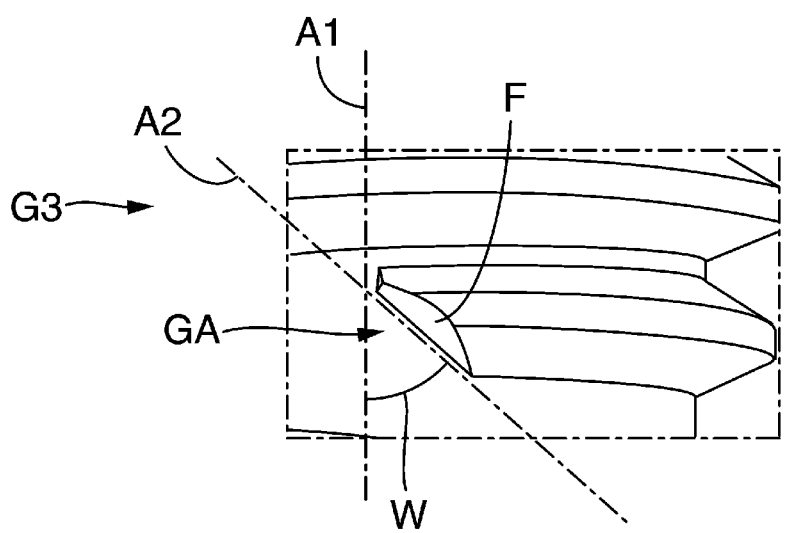
FIG. 4 shows a detail view of a thread of a sensor shown in FIG. 3.

As shown in FIG. 3, the third thread G3 and the fourth thread G4 each have at least one thread start GA, which has a flank F. FIG. 4 shows an enlarged cutout, marked in FIG. 3, of the third thread G3. The third thread G3 extends around the first axis A1. The flank F extends along a second axis A2. Preferably, the first axis A1 and the second axis A2 are arranged at an angle W between 0° and 75° to one another. The flank ensures that an insertion of a wrong thread pairing is avoided. A user will therefore immediately notice, when the sensor is placed at the connection point, whether the sensor is at the appropriate point or not.

Alternatively or in addition to the described embodiments of the geometric mistake-proofing feature, the third geometric, mistake-proofing feature 21 of the first sensor 20 has a first key bit SB1 with a first bit shape, and the fourth geometric, mistake-proofing feature 32 of the second sensor 30 has a second key bit SB2 with a second bit shape different from the first bit shape (see FIG. 5). The first bit shape has, for example, a hexagonal shape, and the second bit shape is, for example, round, oval, or has a polygonal shape or a multi-toothed profile. According to this embodiment, the key bit SB1, SB2 of the sensors 20, 30 is arranged axially behind the thread G3, G4 in the insertion direction. The first key bit SB1 is complementary to the first keyhole SL1, and the second key bit SB2 is complementary to the second keyhole SL2.

In this embodiment, it is possible for the first thread G1, the second thread G2, the third thread G3 and the fourth thread G4 to be identical, since an mistake-proofing effect is achieved by the keyholes and key bits. In this embodiment, a connection system other than a threaded connection, such as a bayonet connection (not shown), is also possible for fastening the sensors in the sensor housing 10.

Figure 6:
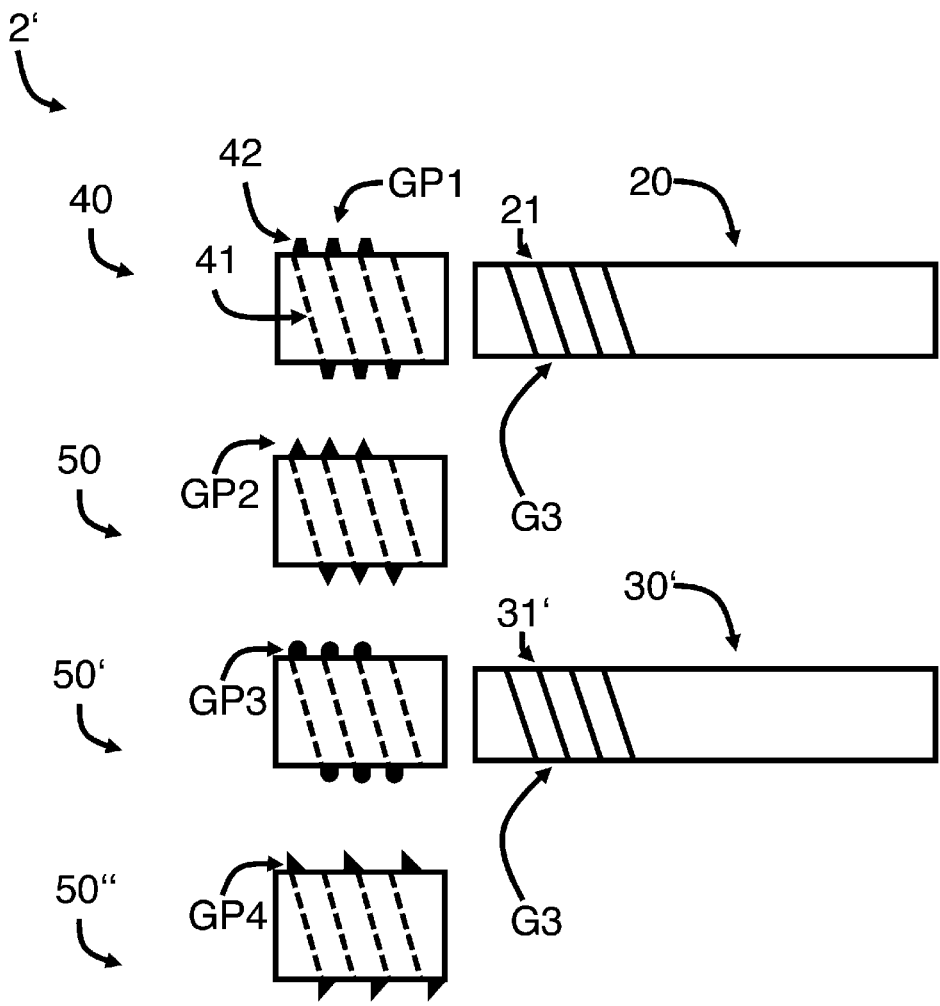
FIG. 6 shows a schematic representation of an alternative sensor set for the multi-parameter sensor of FIG. 1.

FIG. 6 shows an alternative embodiment of the sensor set 2'. The sensor set 2' comprises a first sleeve 40, a second sleeve 50, at least one first sensor 20, and at least one second sensor 30'.

The sensors 20, 30' differ from the sensors 20, 30 used in the other embodiments in that the sensor shafts 21, 31' of the sensors 20, 30' each have the third thread G3. If the sensor set 2' has more than two sensors, each sensor has the same thread on the sensor shaft. If the multi-parameter sensor 1 has further sensors, an individual sleeve 40, 50, 50', 50" is assigned to each further sensor.

The first sleeve 40 has a first internal thread 41 and a first external thread 42. The first internal thread 41 is different from the first external thread 42. The first internal thread 41 is complementary to the third thread G3 of the first sensor shaft 21 of the first sensor 20.

The second sleeve 50 has a second internal thread 51 and a second external thread 52. The second internal thread 51 is identical to the first internal thread 41, and the second external thread 52 is different from the first external thread 42. The first external thread 42 is complementary to the first thread G1 of the first connection point 11. The second external thread 52 is complementary to the second thread G2 of the second connection point 12. The same applies to the further sleeves 50', 50".

Thus, the first connection point 11 is suitable for receiving the first sensor 20 with the first sleeve 40, and the second connection point 12 is suitable for receiving the second sensor 30 with the second sleeve 50. The same applies to the case when further connection points and further sensors are present in the multi-parameter sensor 1.

The sleeves 40, 50, 50', 50" are suitable for being permanently connected to the respective sensor 20, 30, 60, 70—for example, by means of adhesive bonding or welding. Thanks to the sleeves, it is possible to form a standard thread on the sensor shaft of the sensors, so that the sensors are suitable for use in other receiving devices like the connection points of the multi-parameter sensor 1.

The first external thread 42 of the first sleeve 40 has a first pitch S1 and/or a first thread profile GP1, and the second external thread 52 of the second sleeve 50 has a second pitch S2 different from the first pitch S1 and/or a second thread profile GP2 different from the first thread profile GP1.

The first thread profile GP1 is, for example, a metric ISO trapezoidal thread, and the second thread profile GP2 is, for example, a steel-armored pipe thread or a pipe thread or buttress thread.

The invention claimed is:

1. A sensor housing for a multi-parameter sensor, the sensor housing comprising:
   at least two connection points, wherein a first connection point of the at least two connection points is configured to receive a first sensor, and a second connection point of the at least two connection points is configured to receive a second sensor different from the first sensor,
   wherein the first connection point includes a first mistake-proofing feature for the first sensor, the first mistake-proofing feature configured such that only the first sensor can be inserted into the first connection point, and
   wherein the second connection point includes a second mistake-proofing feature for the second sensor, the second mistake-proofing feature configured such that only the second sensor can be inserted into the second connection point.

2. The sensor housing of claim 1, wherein the first mistake-proofing feature comprises a first thread with a first pitch and/or a first thread profile, and wherein the second mistake-proofing feature comprises a second thread with a second pitch different from the first pitch and/or a second thread profile different from the first thread profile.

3. The sensor housing of claim 1, wherein the first mistake-proofing feature includes a first keyhole having a first hole shape, and wherein the second mistake-proofing feature includes a second keyhole having a second hole shape different from the first hole shape.

4. A sensor set for a sensor housing of a multi-parameter sensor, the sensor set comprising:
   a first sensor comprising a first sensor shaft configured to enable fastening the first sensor in a first connection point of the sensor housing, wherein the first sensor shaft includes a third mistake-proofing feature for the first connection point, the third mistake-proofing feature configured such that only the first sensor can be inserted into the first connection point; and a second sensor comprising a second sensor shaft configured to enable fastening the second sensor in a second connection point of the sensor housing, wherein the second sensor shaft includes a fourth mistake-proofing feature for the second connection point, the fourth mistake-proofing feature configured such that only the second sensor can be inserted into the second connection point.

5. The sensor set of claim 4, wherein the third mistake-proofing feature comprises a third thread with a first pitch and/or a first thread profile, and wherein the fourth mistake-proofing feature comprises a fourth thread with a second pitch different from the first pitch and/or a second thread profile different from the first thread profile.

6. The sensor set of claim 5, wherein the third thread and the fourth thread each include a thread start with a flank, wherein the third thread and the fourth thread extend around a first axis, and the flank extends along a second axis, wherein an angle between 0° and 70° is defined between the first axis and the second axis.

7. The sensor set of claim 4, wherein the third mistake-proofing feature includes a first key bit having a first bit shape, and wherein the fourth mistake-proofing feature includes a second key bit having a second bit shape different from the first bit shape.

8. A multi-parameter sensor, the sensor comprising:
a sensor housing, comprising:
at least two connection points, wherein a first connection point of the at least two connection points is configured to receive a first sensor, and a second connection point of the at least two connection points is configured to receive a second sensor different from the first sensor,
wherein the first connection point includes a first mistake-proofing feature for the first sensor, the first mistake-proofing feature configured such that only the first sensor can be inserted into the first connection point, and
wherein the second connection point includes a second mistake-proofing feature for the second sensor, the second mistake-proofing feature configured such that only the second sensor can be inserted into the second connection point; and the sensor set according to claim 4,
wherein the first mistake-proofing feature is complementary to the third mistake-proofing feature, and wherein the second mistake-proofing feature is complementary to the fourth mistake-proofing feature.

9. A multi-parameter sensor, the sensor comprising:
the sensor housing according to claim 1;
a sensor set including at least a first sensor and a second sensor;
a first sleeve including a first internal thread and a first external thread, wherein the first internal thread is different from the first external thread; and
a second sleeve including a second internal thread and a second external thread, wherein the second internal thread is identical to the first internal thread, and wherein the second external thread is different from the first external thread, wherein:
the first connection point of the sensor housing is configured to receive the first sensor with the first sleeve, the first connection point including a first housing thread;
the second connection point of the sensor housing is configured to receive the second sensor, which is different from the first sensor, with the second sleeve, the second connection point including a second housing thread;
the first sensor includes a first sensor shaft, which includes a third thread;
the second sensor includes a second sensor shaft, which includes a third thread, same as the third thread of the first sensor shaft;
the first internal thread of the first sleeve and the third thread of the first and second sensor shafts are complementary;
the first external thread of the first sleeve and the first housing thread of the first connection point are complementary; and
the second external thread of the second sleeve and the second housing thread of the second connection point are complementary.

10. The multi-parameter sensor of claim 9, wherein the first external thread of the first sleeve has a first pitch and/or a first thread profile, and wherein the second external thread of the second sleeve has a second pitch different from the first pitch and/or a second thread profile different from the first thread profile.

* * * * *